Patented May 11, 1943

2,318,669

UNITED STATES PATENT OFFICE 2,318,669

METHOD FOR OXIDIZING WAX

Donald E. Carr, Los Angeles, Calif., assignor to Union Oil Company of California, Los Angeles, Calif., a corporation of California No Drawing. Application April 8, 1940
Serial No. 328,509

7 Claims. (Cl. 260—78)

The present invention relates to a method for producing oxidized petroleum wax. The invention relates particularly to the production of a rubber-like resin from petroleum wax.

It is well known to oxidize wax or other paraffinic substances with an oxygen-containing gas such as air or oxygen or other oxidizing materials such as hydrogen peroxide, while maintaining the charge at an elevated temperature. It is also known that the degree of oxidation will determine the character of the resulting product. For example, in the early stages of oxidation, the charge undergoing oxidation is a soft, viscous, sticky material, whereas in the later stages of oxidation under the same oxidation conditions, the material assumes the character of an elastic rubber-like material which is particularly adapted to be used as a rubber substitute. My invention is particularly related to oxidation of waxes to produce the latter, i. e., rubber-like material. This type of material presumably consists of highly condensed and polymerized compounds of the hydroxy acid type.

I have observed that serious technical difficulty in the production of this material arises from the fact that at advanced stages of oxidation, the material becomes too viscous to continue oxidizing with air and it is therefore not feasible to react all the initial wax. The unreacted wax must thus be extracted or distilled out of the reaction mixture to obtain a resin of satisfactory tensile strength. Both of these separation processes are, however, disadvantageous since gelatinous mixtures are obtained during extraction which are very difficult to filter or separate by decantation, while distillation entails the probability of depolymerizing and thus degrading the desired materials.

I have discovered that the aforementioned difficulties may be overcome by carrying out the oxidation reaction in two stages with a separation step for removal of unreacted or unoxidized wax between these stages. I have found that by removing the unreacted waxes from the partially oxidized charge of the first stage while the charge is still a non-gelatinous fluid that these unreacted waxes may not only be readily removed but the remaining acids may be subjected to the severe oxidation conditions necessary to convert them into rubber-like resins without necessity for subsequent treatment to remove the unreacted waxes from the final oxidation product and thus the heretofore mentioned difficulty or removing the unreacted waxes from difficulty filterable gelatinous mixtures is avoided.

The first stage of oxidation is preferably carried out under such conditions in which a high degree of acidity but very little polymerized or condensed materials are obtained. For example, I may oxidize deoiled petroleum wax with air under 100 lbs. per square inch air pressure for about 20 hours while maintaining a temperature on the charge of about 250–350° F. to produce a partially oxidized wax having an acid number of about 100.

It is advantageous to produce in this first stage a mixture of fatty acids and hydroxy acids, since I have observed that in order subsequently to produce rubber-like resin of the best properties, it is best to oxidize or condense acidic material containing both types of acids, although the hydroxy acids should be present in largest amount. The possibility of exact adjustment of the proportions of the different types of acids for the second stage of oxidation is an important advantage of a preferred method of carrying out my invention.

The next step is to separate the unreacted waxes from the partially oxidized charge. This may be accomplished in various ways such as by saponifying with caustic soda and separating the alkali soluble materials from the unreacted wax and other unsaponifiable constituents. This method is very laborious, however, because of the troublesome emulsions encountered and in addition it does not allow a convenient separation of hydroxy and fatty acids.

A preferred method is to first extract the oxidized wax with a solvent in which the unreacted waxes and fatty acids are soluble but in which the hydroxy acids are insoluble and may be removed as a liquid precipitate. Solvents which may be used for this purpose are preferably liquefied normally gaseous hydrocarbons such as propane and butane. Other solvents which may be used for the purpose are pentane, petroleum ether and various light hydrocarbon fractions.

The solvents are preferably used in the ratio of 4 volumes of solvent to one part of the partially oxidized charge. It is preferable that the temperature of extraction be sufficiently elevated to insure the solution of all unreacted waxes and the solution of high melting and low melting fatty acids. When using propane as the extraction solvent, a temperature of 110° F. and a pressure of 210 lbs. per square inch is satisfactory to enable solution of substantially all of the unreacted waxes and fatty acids contained in the partially oxidized charge. The mixture of partially oxidized charge and solvent or propane is allowed to remain in a quiescent state for a sufficient period of time to enable the wax-free hydroxy acids to settle as a precipitate from which the supernatant solution of propane, fatty acids and wax is decanted.

In order to separate the fatty acids from the unreacted wax and other non-acidic bodies such as esters, alcohols, ketones, etc., the decanted propane solution may be extracted with dilute caustic alkali, the fatty acids being removed into the aqueous phase as alkali soaps. In order to minimize emulsification, this separation is preferably carried out by mixing the caustic and the propane solution at relatively high temperatures, for example, 125°–175° F. After decanting the propane solution containing only unreacted wax and non-acidic oxygenated bodies, the alkali soap solution is neutralized with a mineral acid, such as hydrochloric or sulfuric and the fatty acids are thereby "cracked out" as a separate phase and removed by decantation.

As an alternative to the above treatment, the separated solution of unreacted wax and fatty acids in propane may be chilled to a sufficiently low temperature, for example, −40° F. to 0° F. in order to precipitate the waxes and high melting acids. When using propane as the extraction solvent, the chilling may be accomplished by reducing the pressure on the mixture to atmospheric to allow a portion of the propane to vent to the atmosphere. The chilled mixture is then filtered to obtain the unreacted wax and high melting acids as a cake while the filtrate consists of the low melting acids. The latter is then distilled to remove the solvent from the low melting acids.

The above filter cake consisting of unreacted waxes and high melting acids may then be extracted with such selective solvents as acetone, alcohol and the like which are adapted to dissolve the high melting acids but not the wax. The acids may be recovered by distilling the solution of acids in selective solvents to remove the solvent. Preferably, the extraction of the high melting acids is carried out with 3 volumes of solvent and at a temperature of 100° F. If desired, the extraction of the high melting fatty acids from the wax may be carried out with caustic soda and acid as described above.

The aforementioned fractions of wax-free oxidation products, i. e. (1) the hydroxy acids recovered in the hot propane precipitation and (2) the fatty acids recovered by the method involving caustic alkali extraction of the propane solution freed of hydroxy acids or (1) the hydroxy acids recovered in the hot propane precipitation, (2) the high melting acids recovered from the filter cake by the method involving chilling and filtration and (3) the low melting fatty acids recovered from the filtrate by the same method, may be combined or used separately for the second stage oxidation described below. As stated previously, it is preferable to combine the hydroxy acids with the fatty acids to obtain a proper material for oxidation to rubber-like materials.

After blending in suitable proportions, the wax-free oxidation products are next oxidized under drastic conditions, favoring resinification, such as at 500° F., until the product attains the desired rubbery consistency. The oxidation may be carried out in the presence of polymerization-inducing organic or inorganic peroxides such as hydrogen peroxide, barium peroxide, benzoyl peroxide or the like. As mentioned previously, it is preferable to select a certain ratio of hydroxy acids to fatty acids for the second stage oxidation in order to yield a product of the most desirable characteristics. This ratio will vary with different waxes but usually involves a predominant proportion of hydroxy acids.

The oxidized product is then ready for milling, vulcanizing or compounding as known in the art without the necessity of separation of unoxidized impurities.

The stock to be treated is preferably a relatively high melting petroleum wax of 140° F. melting point or higher, recovered from lubricating distillates. Preferably when producing the oxidized substances from slack wax or waxes containing considerable quantities of oil, the crude wax is first deoiled to a low oil content. This may be accomplished by dissolving the wax in a suitable solvent such as propane, then chilling the solution to reprecipitate the wax and filtering the mixture. If desired, the crude wax may be sweated to remove the contained oil in accordance with known methods. A preferred deoiling method is to melt the slack wax and gradually chill the melted wax to a temperature of about 70° F. to precipitate the high melting wax in the mother oil and low melting waxes. This is preferably accomplished with continual stirring in order to prevent the mass from setting up solid. Then about one volume of a good wax anti-solvent, such as methyl ethyl ketone, is mixed with the chilled mixture to dissolve the oil and low melting waxes and the mixture is then filtered to recover the undissolved wax.

The crude deoiled wax may be subsequently acid treated in order to remove asphalt, resins and other easily oxidized materials which are more reactive than the paraffin with the oxidizing agent and which may prevent the proper course of oxidation.

In general, the oxidation reaction in either stage is carried out by heating the charge and passing air or oxygen through the charge as is commonly done in the usual oxidation of paraffin wax or asphalt. If desired, hydrogen peroxide may be added while agitating the charge at the elevated temperature. The rate of adding hydrogen peroxide is such as to prevent an overly violent reaction and yet to permit the full utilization of the liberated nascent oxygen so that there will be a minimum escape of undecomposed hydrogen peroxide. This, in general, means that it must be added slowly such as by the drop-wise method in laboratory apparatus. However, any hydrogen peroxide that may escape may pass through a condenser with steam produced in the process and thus recovered. It is preferable to agitate the charge during oxidation; preferably by a current of air or non-reducing gas in order to prevent too violent local reaction with excessive frothing and failure to obtain uniform contact. I prefer to use air for agitation because I obtain additional oxidation from the oxygen in the air which appears to be activated and the reaction, therefore, catalyzed by the hydrogen peroxide.

A method which has been found to be effective for oxidizing paraffins resides in passing a current of air or oxygen through a separate vessel containing the hydrogen peroxide and thence passing the activated air or oxygen into the charge while maintaining the latter at an elevated temperature. In this procedure the oxidation is, in effect, carried out with the air or oxygen, the hydrogen peroxide merely acting in the nature of a catalyst to speed up the oxidation reaction. Therefore, a considerable saving will be made in the use of hydrogen peroxide when employing this process.

It is thus an object of my invention to prepare rubber-like resins by oxidation of petroleum wax.

A further object of my invention is to effect the oxidation reaction in two stages with a separatory step between them to remove unreacted waxes.

Other objects, features and advantages of my invention will become apparent to those skilled in the art as the description of my invention proceeds which is more fully described below and in which a specific example for carrying out the invention is given. However, it will be observed that the example given below is not to be considered as limiting my invention but is merely illustrative of one method for carrying it out.

A charge of slack wax separated from a lubricating oil distillate produced from a Santa Fe Springs crude oil and having an S. A. E. grade of 20 when refined, that is, after separating the wax and low grade lubricating oil fractions, such as those which are soluble in selective solvents such as sulfur dioxide and the like, was deoiled to produce a wax having a melting point of about 140° F. Deoiling was accomplished by melting the slack wax at about 150° F. and gradually cooling the wax to 70° F. while continuously stirring the charge after which about one volume of methyl ethyl ketone was added to the charge being agitated. This mixture was then filtered to recover the deoiled wax as a filter cake.

The thus deoiled wax was then heated to a temperature of about 300° F. and was air blown for about 30 hours in the presence of ½% by weight of manganese naphthenate while maintaining the temperature of 300° F. The resulting product consisting of a mixture of unreacted wax, hydroxy and fatty acids, esters and other oxygenated compounds, had an acid number of about 100 and a saponification number of about 175.

The partially oxidized charge was then mixed with about 4 volumes of propane at 110° F. and at a pressure of 210 lbs. per square inch to maintain the propane liquid. The propane dissolved all of the unreacted wax and the straight chain fatty acids and also esters, ketones, etc., leaving the hydroxy acids as an insoluble liquid phase which settled below the layer of the propane solution. The latter was decanted from the layer of hydroxy acids. The decantate was mixed with a 50% excess of 5% sodium hydroxide solution in order to convert the fatty acids and esters into soaps which settled below the solution of propane and unreacted wax. The latter was decanted from the soap layer. The soap layer was then neutralized with sulfuric acid which resulted in liberating the acids which were removed from the salt solution.

Approximately 25% by weight of the thus recovered fatty acids were blended with about 75% of the hydroxy acids recovered in the first extraction step and this blend was oxidized at a temperature of about 500° F. for about ten hours. The oxidation was carried out by passing air through the melted material while adding slowly hydrogen peroxide of 35% concentration to the heated charge at a rate sufficiently rapid to cause bubbling of the charge and yet not so rapid as to cause the entire charge to froth excessively and overflow the vessel in which the oxidation was taking place.

The resulting product was a highly elastic rubber-like material which was insoluble in benzene, toluene, alcohol, acetone, cleaner's naphtha, 86° Baumé naphtha, carbon tetrachloride, ether, chloroform and carbon bisulfide. A portion of this material was then vulcanized with 9% by weight of sulfur for three hours at a temperature of about 275° F. to produce a product similar to vulcanized rubber.

It will be understood that the foregoing description of my invention is not to be considered as limiting as many variations thereof may be made by those skilled in the art within the scope of the following claims.

I claim:
1. A process for producing rubber-like materials from waxes which comprises partially oxidizing said wax with an oxygen-containing gas at a temperature of approximately 250–350° F. for a period of time sufficient to produce a mixture of unoxidized wax and hydroxy and fatty acids having an acid number of approximately 100, extracting said partially oxidized wax with a solvent adapted to dissolve said unoxidized wax and fatty acids but to leave hydroxy acids as an undissolved fraction, separating the solution of solvent, unoxidized wax and fatty acids from the undissolved hydroxy acids, separating fatty acids from said solution, commingling said fatty acids with said hydroxy acids and oxidizing said mixture at an elevated temperature of approximately 500° F. until said mixture assumes rubber-like characteristics.

2. A process as in claim 1 in which said fatty acids are recovered from said solution of solvent, unoxidized wax and fatty acids, by converting said acids into soaps with a caustic alkali, separating the soaps from the solution of solvent and unoxidized wax and neutralizing the soap with an acid.

3. A process as in claim 1 in which said fatty acids are recovered from said solution of solvent, unoxidized wax and fatty acids by chilling said solution to precipitate unoxidized wax, separating the solution from the precipitated wax and recovering the acids dissolved in said solvent.

4. A process for producing rubber-like materials from petroleum wax which comprises subjecting a petroleum wax having a melting point of at least approximately 140° F. to oxidation with an oxygen-containing gas at a temperature of approximately 250–350° F. for a period of time sufficient to produce a partially oxidized wax having an acid number of about 100, separating unreacted wax from partially oxidized wax and subjecting said separated partially oxidized wax to further oxidation with an oxygen-containing gas at a temperature of approximately 500° F. for a period of time sufficient to produce an oxidized material having elastic and rubber-like characteristics and which is substantially insoluble in benzene, toluene, alcohol, acetone, 86° Baumé naphtha, carbon tetrachloride, ether, chloroform and carbon bisulfide.

5. A process for producing rubber-like materials from petroleum wax which comprises subjecting a petroleum wax to oxidation with an oxygen-containing gas at a temperature of approximately 250–350° F. for a period of time sufficient to produce a mixture containing hydroxy acids, fatty acids and unreacted wax, separating a mixture of fatty acids and unreacted wax from said mixture to produce a hydroxy acid fraction substantially free from fatty acids and unreacted wax, separating fatty acids from said mixture of fatty acids and unreacted wax, mixing a portion of said separated fatty acids with said separated hydroxy acids and subjecting said mixture of fatty acids and hydroxy acids to oxidation with an oxygen-containing gas at a temperature of approximately 500° F. for a period of time sufficient to produce an oxidized material having elastic and rubber-like characteristics and which is substantially insluble in benzene, toluene, alcohol, acetone, 86° Baumé naphtha, carbon tetrachloride, ether, chloroform and carbon bisulfide.

6. A process for producing rubber-like materials from waxes which comprises partially oxidizing said wax with an oxygen-containing gas at a temperature of approximately 250–350° F. for a period of time sufficient to produce a mixture of unoxidized wax and hydroxy and fatty acids having an acid number of approximately 100, extracting said partially oxidized wax with a solvent adapted to dissolve said unoxidized wax and fatty acids but to leave hydroxy acids as an undissolved fraction, separating the solution of solvent, unoxidized wax and fatty acids from the undissolved hydroxy acids, chilling said solution of solvent, unoxidized wax and fatty acids to precipitate wax and high melting acids, leaving low melting acids in solution in said solvent, separating the solution of low melting acids and solvent from the mixture of unoxidized wax and high melting acids, extracting the mixture of unoxidized wax and high melting acids with a selective solvent to separate said high melting acids from unoxidized wax, separating selective solvent from high melting acids and oxidizing said high melting acids at an elevated temperature of approximately 500° F. until said acids assume rubber-like characteristics.

7. A process for producing rubber-like materials from waxes which comprises partially oxidizing said wax with an oxygen-containing gas at a temperature of approximately 250–350° F. for a period of time sufficient to produce a mixture of unoxidized wax and hydroxy and fatty acids having an acid number of approximately 100, extracting said partially oxidized wax with a solvent adapted to dissolve said unoxidized wax and fatty acids but to leave hydroxy acids as an undissolved fraction, separating the solution of solvent, unoxidized wax and fatty acids from the undissolved hydroxy acids, chilling said solution of solvent, unoxidized wax and fatty acids to precipitate wax and high melting acids, leaving low melting acids in solution in said solvent, separating the solution of low melting acids and solvent from the mixture of unoxidized wax and high melting acids, treating the mixture of unoxidized wax and high melting acids with a caustic alkali to convert said acids into soaps, separating the soaps from the unoxidized wax, neutralizing the soap with an acid to produce high melting acids and oxidizing said high melting acids at an elevated temperature of approximately 500° F. until said acids assume rubber-like characteristics.

DONALD E. CARR.